United States Patent
Mironov et al.

(10) Patent No.: US 10,485,267 B2
(45) Date of Patent: Nov. 26, 2019

(54) FLUID PERMEABLE HEATER ASSEMBLY WITH CAP

(71) Applicant: Altria Client Services LLC, Richmond, VA (US)

(72) Inventors: Oleg Mironov, Neuchatel (CH); Ihar Nikolaevich Zinovik, Peseux (CH); Jean-Marc Widmer, Lignieres (CH); Keethan Dasnavis Fernando, Neuchatel (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 15/658,881

(22) Filed: Jul. 25, 2017

(65) Prior Publication Data

US 2018/0020737 A1    Jan. 25, 2018

Related U.S. Application Data (63) Continuation of application No. PCT/EP2017/065063, filed on Jun. 20, 2017.

(30) Foreign Application Priority Data

Jul. 25, 2016   (EP) .................... 16180958

(51) Int. Cl.
*A24F 13/00*    (2006.01)
*A24F 17/00*    (2006.01)
(Continued)

(52) U.S. Cl.
CPC .............. *A24F 47/008* (2013.01); *F16T 1/00* (2013.01); *F22B 1/284* (2013.01); *H05B 1/0277* (2013.01); *H05B 3/44* (2013.01)

(58) Field of Classification Search
CPC ...... A24F 47/00; A24F 47/004; A24F 47/008; A61M 11/003; A61M 11/042
(Continued)

(56) References Cited

U.S. PATENT DOCUMENTS

2012/0153688 A1 * 6/2012 Gerken ................ H05B 3/06
                                                         297/180.12
2013/0333700 A1 * 12/2013 Buchberger .......... A24F 47/008
                                                         128/203.26
(Continued)

FOREIGN PATENT DOCUMENTS

WO   WO-2015/117701 A1   8/2015
WO   WO-2015/117702 A1   8/2015
(Continued)

OTHER PUBLICATIONS

European Search Report for European Application No. 16180958 dated Jan. 24, 2017.
(Continued)

*Primary Examiner* — Tho D Ta
*Assistant Examiner* — Thang H Nguyen
(74) *Attorney, Agent, or Firm* — Harness, Dickey & Pierce, P.L.C.

(57) ABSTRACT

A fluid permeable heater assembly for an aerosol-generating system includes a cap and a substantially flat electrically conductive and fluid permeable heating element. The cap includes a hollow body with a first cap opening and a second cap opening. The first cap opening is opposite to the second cap opening. The heating element is configured to vaporise aerosol-forming substrate. The heating element is mounted on the cap, such that the heating element extends across the first cap opening. A cartridge for an aerosol-generating system includes the heater assembly, a liquid storage portion, a mouth piece, and a retainer.

12 Claims, 8 Drawing Sheets

(51) Int. Cl.
  *A24F 25/00*  (2006.01)
  *A24F 47/00*  (2006.01)
  *F22B 1/28*  (2006.01)
  *H05B 3/44*  (2006.01)
  *F16T 1/00*  (2006.01)
  *H05B 1/02*  (2006.01)

(58) Field of Classification Search
  USPC .................................................. 131/329, 328
  See application file for complete search history.

(56) References Cited

U.S. PATENT DOCUMENTS

| | | | | |
|---|---|---|---|---|
| 2016/0338410 | A1* | 11/2016 | Batista | A24F 47/008 |
| 2016/0345630 | A1* | 12/2016 | Mironov | A24F 47/008 |
| 2017/0027226 | A1* | 2/2017 | Mironov | A24F 47/008 |
| 2017/0290370 | A1* | 10/2017 | Garthaffner | A24F 47/008 |
| 2017/0325505 | A1* | 11/2017 | Force | A24F 47/008 |
| 2017/0360093 | A1* | 12/2017 | Fernando | A24F 47/004 |
| 2018/0014575 | A1* | 1/2018 | Fursa | A24F 47/008 |

FOREIGN PATENT DOCUMENTS

| | | |
|---|---|---|
| WO | WO-2015/117704 A1 | 8/2015 |
| WO | WO-2015/117705 A2 | 8/2015 |
| WO | WO-2015117703 A1 | 8/2015 |
| WO | WO-2016/096497 A1 | 6/2016 |
| WO | WO-2016/096745 A1 | 6/2016 |
| WO | WO-2016/096780 A1 | 6/2016 |
| WO | WO-2017/207320 A1 | 12/2017 |

OTHER PUBLICATIONS

Written Opinion for corresponding Application No. PCT/EP2017/065063 dated Sep. 26, 2017.
International Search Report for corresponding Application No. PCT/EP2017/065063 dated Sep. 27, 2017.
Notification of Trasmittal of the International Search Report and the Written Opinion of the Internaitonal Searching Authority, or the Declaration, dated Sep. 27, 2017.
Notification of Transmittal of the International Preliminary Report on Patentability, dated Oct. 23, 2018.
Written Opinion for corresponding European Application No, PCT/EP2017/065063 dated Jun. 20, 2018.
GC Examination Report for corresponding Application No. GC 2017-33689 dated Mar. 27, 2019.

* cited by examiner

FLUID PERMEABLE HEATER ASSEMBLY WITH CAP

CROSS-REFERENCE TO RELATED APPLICATIONS

This application is a continuation of, and claims priority to, international application no. PCT/EP2017/065063, filed on Jun. 20, 2017, and further claims priority under 35 U.S.C. § 119 to European Patent Application No. 16180958.7, filed Jul. 25, 2016, the entire contents of each of which are incorporated herein by reference.

BACKGROUND

Field

Example embodiments relate to aerosol-generating systems. At least one example embodiment relates to heater assemblies for aerosol-generating systems in which the aerosol-forming substrate is liquid and vaporised.

Description of Related Art

Handheld electrically operated aerosol-generating system may include a device portion comprising a battery and control electronics, a cartridge portion comprising a supply of aerosol-forming substrate held in a liquid storage portion, and an electrically operated heater assembly acting as a vaporiser. The heater assembly may comprise a fluid permeable heating element that is in contact with a capillary medium like an elongated wick soaked in the liquid aerosol-forming substrate held in the liquid storage portion. The cartridge portion may comprise not only the supply of aerosol-forming substrate and an electrically operated heater assembly, but also a mouthpiece.

A heater assembly with a fluid permeable heating element may have a fragile structure.

SUMMARY

At least one example embodiment relates to a heater assembly for an aerosol-generating system.

In at least one example embodiment, a heater assembly is fluid permeable. The heater assembly comprising a cap and a heating element. The cap includes a hollow body having a first cap opening and a second cap opening. The first cap opening is opposite the second cap opening. The cap is integrally formed. The cap also includes a holder including a holder opening. The holder is configured to cover the first cap opening such that the holder opening superposes with at least a portion of the first cap opening. The heating element is a substantially flat electrically conductive and fluid permeable heating element. The heating element is configured to vaporise an aerosol-forming substrate. The heating element is mounted on the holder such that the heating element extends across the first cap opening.

In at least one example embodiment, the heater assembly includes a host material piece configured to retain the aerosol-forming substrate. At least a portion of the host material piece is arranged in the hollow body between the first cap opening and the second cap opening. The host material piece is substantially a same size and a same shape as an interior space of the hollow body. An interior space of the hollow body has a substantially cylindrical shape. The host material piece is at least partially in contact with the heating element.

In at least one example embodiment, the heater assembly includes a transport material piece configured to transport the aerosol-forming substrate from the host material piece to the heating element. The transport material piece is in contact with the heating element. The transport material piece is between the heating element and the host material piece. The heating element is mounted on the holder.

In at least one example embodiment, the transport material piece is in the holder opening. The transport material piece has substantially a same size and a same shape as the holder opening.

In at least one example embodiment, the heating element comprises: a mesh including at least two electrically conductive contact areas. Each of the at least two electrically conductive contact areas are positioned at an edge area of the heating element. The mesh extends across at least a portion of the first cap opening.

In at least one example embodiment, the at least two electrically conductive contact areas are at a dense area of the heating element.

At least one example embodiment relates to a cartridge for an aerosol-generating system.

In at least one example embodiment, a cartridge for an aerosol-generating system comprises a heater assembly. The heater assembly includes a cap including a hollow body having a first cap opening and a second cap opening. The first cap opening is opposite the second cap opening. The cap is integrally formed. The cap also includes a holder including a holder opening. The holder is configured to cover the first cap opening such that the holder opening superposes with at least a portion of the first cap opening. The heater assembly also includes a heating element. The heating element is a substantially flat electrically conductive and fluid permeable heating element. The heating element is configured to vaporise an aerosol-forming substrate. The heating element is mounted on the holder such that the heating element extends across the first cap opening. The cartridge also includes a storage portion configured to store an aerosol-forming substrate and a retainer configured to retain the heater assembly and configured to retain the heater assembly in contact with the storage portion.

In at least one example embodiment, the cartridge also includes a mouth piece configured to hold the storage portion.

At least one example embodiment relates to an aerosol-generating system.

In at least one example embodiment, an aerosol-generating system, comprises a main unit and a cartridge. The cartridge includes a heater assembly. The heater assembly includes a cap. The cap includes a hollow body and a holder. The hollow body has a first cap opening and a second cap opening. The first cap opening is opposite the second cap opening. The cap is integrally formed. The holder includes a holder opening. The holder is configured to cover the first cap opening such that the holder opening superposes with at least a portion of the first cap opening. The heater assembly also includes a heating element. The heating element is a substantially flat electrically conductive and fluid permeable heating element. The heating element is configured to vaporise an aerosol-forming substrate. The heating element is mounted on the holder such that the heating element extends across the first cap opening. The cartridge also includes a storage portion configured to store an aerosol-forming substrate, and a retainer configured to retain the heater assembly and configured to retain the heater assembly in contact with the storage portion. The cartridge is removably coupled to the main unit.

BRIEF DESCRIPTION OF THE DRAWINGS

Example embodiment will now be described, by way of example only, with reference to the accompanying drawings.

DETAILED DESCRIPTION

Example embodiments will become more readily understood by reference to the following detailed description of the accompanying drawings.

Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

At least one example embodiment relates to a fluid permeable heater assembly for an aerosol-generating system. The heater assembly comprises a cap. The cap comprises a hollow body with a first and a second cap opening. The first cap opening is opposite to the second cap opening, and a substantially flat electrically conductive and fluid permeable heating element. The heating element is configured to vaporise aerosol-forming substrate. The heating element is mounted on the cap such that the heating element extends across the first cap opening.

A cap with a hollow body may be attached to the heating element to improve stability of the heating element and to provide guidance for a capillary medium that may be arranged in the hollow body of the cap. The use of a cap may simplify the manufacturing of the heater assembly and may improve the rigidity of the heater assembly.

The cap may cover a filled cartridge.

As used herein, "substantially flat" means formed initially in a single plane and not wrapped around or other conformed to fit a curved or other non-plank shape. As used herein, "electrically conductive" means formed from a material having a resistivity of about $1\times10^{-4}$ Ohm meter, or less. As used herein, "electrically insulating" means formed from a material having a resistivity of about $1\times10^{4}$ Ohm meter or more. As used herein, "fluid permeable" in relation to a heater assembly means that the aerosol-forming substrate, in a gaseous phase and possibly in a liquid phase, can readily pass through the heating element of the heater assembly.

The heater assembly comprises a cap formed from a material with a high thermal decomposition temperature and that is able to tolerate rapid temperature changes. The heating element is supported on the cap. In at least one example embodiment, the cap is molded from plastic granules. The plastic granules may be of polyether ether ketone (PEEK), liquid-crystal polymers (LCP) or any other polymer material. In at least one example embodiment, the cap material is over-molded on the underside of the heating element. In at least one example embodiment, the cap is made of VICTREX PEEK via over-molding on a mesh strip. The underside of the heating element is oriented towards the first cap opening. The cap may be over molded onto the underside of the heating, such that no further mounting material, such as terminals, is required to fix the heating element on the cap.

In at least one example embodiment, the cap has a size sufficient to distance the liquid storage portion from the heating element by a distance of at least about 1.5 millimeters, or from about 3 millimeters to about 6 millimeters in order to provide a sufficient temperature drop across the cap. In at least one example embodiment, the liquid storage portion can be made from a more cost efficient material with a lower thermal decomposition temperature, such as for example polyethylene or polypropylene.

The heater assembly further comprises a substantially flat heating element allowing for simple manufacture. Geometrically, the term "substantially flat" electrically conductive heating element is used to refer to an electrically conductive arrangement of filaments that is in the form of a substantially two dimensional topological manifold. Thus, the substantially flat electrically conductive heating element extends in two dimensions along a surface substantially more than in a third dimension. In particular, the dimensions of the substantially flat heating element in the two dimensions within the surface is at least five times larger than in the third dimension, normal to the surface. An example of a substantially flat heating element is a structure between two substantially imaginary parallel surfaces, wherein the distance between these two imaginary surfaces is substantially smaller than the extension within the surfaces. In some embodiments, the substantially flat heating element is planar. In other embodiments, the substantially flat heating element is curved along one or more dimensions, for example forming a dome shape or bridge shape.

The term "filament" is used throughout the specification to refer to an electrical path arranged between two electrical contacts. A filament may arbitrarily branch off and diverge into several paths or filament respectively, or may converge from several electrical paths into one path. A filament may have a round, square, flat or any other form of cross-section. A filament may be arranged in a straight or curved manner.

The term "heating element" is used throughout the specification to refer to an arrangement of one or a plurality of filaments. The heating element may be an array of filaments, for example arranged parallel to each other. The heating element is fluid permeable. The heating element may be cut so as to provide open areas when mounting the heating element across the first cap opening. In at least one example embodiment, the open areas are manufactured by cutting bevelled window slots out of each side of the heating element. In at least one example embodiment, the filaments may form a mesh. The mesh may be woven or non-woven. The mesh may be formed using different types of weave or lattice structures. Alternatively, the electrically conductive heating element consists of an array of filaments arranged parallel to one another. The mesh, array or fabric of electrically conductive filaments may also be characterized by its ability to retain liquid.

In at least one example embodiment, a substantially flat heating element may be constructed from a wire that is formed into a wire mesh. In at least one example embodiment, the mesh has a plain weave design. In at least one example embodiment, the heating element is a wire grill made from a mesh strip.

The electrically conductive filaments may define interstices between the filaments and the interstices may have a width of about 10 micrometers to about 100 micrometers. In at least one example embodiment, the filaments give rise to capillary action in the interstices, so that in use, liquid to be vaporized is drawn into the interstices, increasing the contact area between the heating element and the liquid aerosol-forming substrate.

The electrically conductive filaments may form a mesh of size between 60 and 240 filaments per centimeter (+/−10 percent). In at least one example embodiment, the mesh density is between 100 and 140 filaments per centimeter (+/−10 percent). In at least one example embodiment, the mesh density is approximately 115 filaments per centimeter. The width of the interstices may range from about 100 micrometers to about 25 micrometers, or from about 80 micrometers to about 70 micrometers. In at least one example embodiment, the width of the interstices may be about 74 micrometers. The percentage of open area of the mesh, which is the ratio of the area of the interstices to the total area of the mesh may range from about 40 percent to about 90 percent, from about 85 percent to about 80 percent, or may be about 82 percent. Throughout this specification, the density of such a mesh is referred to as "first mesh density".

Additionally, the mesh may have one or more sections with increased mesh density, referred to as "second mesh density", where the interstices between the filaments are below about 5 micrometers, below about 2 micrometers, or be about 1 micrometer. The one or more sections of the mesh with increased mesh density are referred to as "dense areas" throughout this specification.

The electrically conductive filaments may have a diameter ranging from about 8 micrometers to about 100 micrometers, from about 10 micrometers to about 50 micrometers, or from about 12 micrometers to about 25 micrometers. The filaments may have a round cross section or may have a flattened cross-section.

The area of the mesh, array or fabric of electrically conductive filaments may be small, for example less than or equal to about 50 square millimeters, less than or equal to about 25 square millimeters, or about 15 square millimeters. The size is chosen such to incorporate the heating element into a handheld system. Sizing of the mesh, array or fabric of electrically conductive filaments less or equal than about 50 square millimeters reduces the amount of total power required to heat the mesh, array or fabric of electrically conductive filaments while still ensuring sufficient contact of the mesh, array or fabric of electrically conductive filaments to the liquid aerosol-forming substrate. The mesh, array or fabric of electrically conductive filaments may, for example, be rectangular and have a length ranging from about 2 millimeters to about 10 millimeter and a width ranging from about 2 millimeters to about 10 millimeters. In at least one example embodiment, the mesh has dimensions of about 5 millimeters by about 3 millimeters. The mesh or array of electrically conductive filaments may cover an area of about 30 percent to about 90 percent of the open area of the first cap opening across which the heating element extends. In at least one example embodiment, the mesh or array of electrically conductive filaments covers an area of about 50 percent to about 70 percent of the open area of the first cap opening. In at least one example embodiment, the mesh or array of electrically conductive filaments covers an area of about 55 percent to about 65 percent of the open area of the first cap opening.

The filaments of the heating element may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. The filaments may be coated with one or more insulators. The materials for the electrically conductive filaments are stainless steel and graphite. For example, the materials may include 300 series stainless steel like AISI 304, 316, 304L, 316L. Additionally, the electrically conductive heating element may comprise combinations of the above materials. A combination of materials may be used to improve the control of the resistance of the substantially flat heating element. For example, materials with a high intrinsic resistance may be combined with materials with a low intrinsic resistance so as to control price. A substantially flat filament arrangement with increased resistance may reduce parasitic losses. High resistivity heaters may allow more efficient use of battery energy.

In at least one example embodiment, the filaments are made of wire. In at least one example embodiment, the wire is made of metal, such as stainless steel.

The electrical resistance of the mesh, array or fabric of electrically conductive filaments of the heating element may be about 0.3 Ohms to about 4 Ohms. In at least one example embodiment, the electrical resistance is equal or greater than about 0.5 Ohms. In at least one example embodiment, the electrical resistance of the mesh, array or fabric of electrically conductive filaments is about 0.6 Ohms to about 0.8 Ohms, or about 0.68 Ohms. The electrical resistance of the mesh, array or fabric of electrically conductive filaments is at least an order of magnitude, or at least two orders of magnitude, greater than the electrical resistance of electrically conductive contact areas. This ensures that the heat generated by passing current through the heating element is localized to the mesh or array of electrically conductive filaments. The system may have a low overall resistance for the heating element if the system is powered by a battery. A low resistance, high current system allows for the delivery of high power to the heating element. This allows the heating element to heat the electrically conductive filaments to a desired temperature quickly.

The hollow body of the cap may be configured to hold a capillary medium. In at least one example embodiment, the heater assembly comprises a host material piece made from the capillary medium for retaining the liquid aerosol-forming substrate. At least a portion of the host material piece may be arranged in the hollow body between the first and the second cap opening.

The cap and the host material piece may be sized to have a cross-sectional area of approximately the same size. As used here, approximately the same size means that a cross-sectional area of the cap comprising the first cap opening may be up to 30 percent smaller or larger than the capillary material. The shape of the interior space of the hollow body of the cap may also be similar to the shape of the capillary material such that the assembly and the material substantially overlap. In at least one example embodiment, the host material piece is substantially the same size and shape as the interior space of the hollow body. In at least one example embodiment, the interior space of the hollow body is substantially of cylindrical shape. The volume of the interior space of the hollow body may be about 50 cubic millimetres to about 500 cubic millimeters, about 100 cubic millimeters to about 250 cubic millimeters, or about 150 cubic millimeters.

The host material piece may be provided at least partially in contact with the heating element. When the assembly and the material are substantially similar in size and shape, manufacturing can be simplified and the robustness of the manufacturing process improved.

In at least one example embodiment, the heater assembly comprises a transport material piece made from a capillary medium for transporting liquid aerosol-forming substrate from the host material piece to the heating element. The transport material piece may be provided in contact with the heating element. In at least one example embodiment, the transport material piece is arranged between the heating element and the host material piece. In this case, the host material is not in direct contact with the heating element.

The transport material piece may be made of a material configured to guarantee that there is liquid aerosol-forming substrate in contact with at least a portion of the surface of the heating element that extends across the first cap opening. The transport material piece may be in contact with the electrically conductive filaments. The transport material piece may extend into interstices between the filaments. The heating element may draw liquid aerosol-forming substrate into the interstices by capillary action. In at least one example embodiment, the transport material piece is in contact with the electrically conductive filaments over substantially the entire extent of the open area of the first cap opening.

A capillary material is a material that actively conveys liquid from one end of the material to another. The capillary material may be oriented, directly or indirectly via another capillary medium, in contact with a liquid storage portion to convey liquid aerosol-forming substrate towards the heating element.

The capillary material may include even more than two capillary materials including one or more layers of the capillary material directly in contact with the mesh, array or fabric of electrically conductive filaments of the heating element in order to promote aerosol generation.

The capillary material may have a fibrous or spongy structure. The capillary material comprises a bundle of capillaries. For example, the capillary material may comprise a plurality of fibres or threads or other fine bore tubes. The fibres or threads may be generally aligned to convey liquid aerosol-forming substrate towards the heating element. Alternatively, the capillary material may comprise sponge-like or foam-like material. The structure of the capillary material forms a plurality of small bores or tubes, through which the liquid aerosol-forming substrate can be transported by capillary action. The capillary material may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and vapour pressure, which allow the liquid aerosol-forming substrate to be transported through the capillary medium by capillary action.

At least one of the capillary materials may be of sufficient volume in order to ensure that a minimal amount of liquid aerosol-forming substrate is present in said capillary material to prevent "dry heating", which occurs if insufficient liquid aerosol-forming substrate is provided to the capillary material in contact with the mesh, array or fabric of electrically conductive filaments. A minimum volume of said capillary material may be provided in order to allow for about 20 to about 40 puffs. An average volume of liquid aerosol-forming substrate volatilized during a puff of a length of about 1 second to about 4 seconds about 1 to milligram to about 4 milligrams of liquid aerosol-forming substrate. Thus, providing at least one capillary material having a volume to retain about 20 milligrams to about 160 milligrams of the liquid aerosol-forming substrate may reduce and/or substantially prevent the dry heating.

The cap may contain two or more different capillary materials, wherein the transport material piece, in contact with the heating element, may have a higher thermal decomposition temperature and the host material piece, in contact with the transport material piece, but not in contact with the heating element, may have a lower thermal decomposition temperature. The transport material piece effectively acts as a spacer separating the heating element from the host material piece so that the host material piece is not exposed to temperatures above its thermal decomposition temperature. As used herein, "thermal decomposition temperature" means the temperature at which a material begins to decompose and lose mass by generation of gaseous by products. The host material piece may occupy a greater volume than the transport material piece and may hold more aerosol-forming substrate than the transport material piece. The host material piece may have superior wicking performance as compared to the transport material piece. The host material piece may be cheaper than the transport material piece. The host material piece may be polypropylene.

The transport material piece may separate the heating element from the host material piece by a distance of at least about 0.5 millimeter, about 0.5 millimeter to about 2 millimeters, or about 0.75 millimeter in order to provide a sufficient temperature drop across the transport material piece.

In at least one example embodiment, the cap comprises a holder with a holder opening. The holder may be a planar disk covering at least the first cap opening and having a thickness of about 0.25 millimeter to about 5 millimeters, about 0.5 millimeter to about 2.5 millimeters, or about 0.8 millimeter. The holder opening may have a size of about 10 square millimeters to about 50 square millimeters, about 20 square millimeters to about 30 square millimeters, or about 25 square millimeters. The holder may cover the first cap opening such that the holder opening coincides with at least a portion of the first cap opening. The heating element may be mounted on the holder. A surface of the holder is in contact with the heating element and represents a contact area that enlarges the contact area as compared to a cap without a holder. The holder reduces the size of the first cap opening to the size of the holder opening. Enlarging the contact area between holder and heating element may improve rigidity of the heater assembly and may ease the assembly thereof. In at least one example embodiment, the cap including the holder is over-molded on the underside of the heating element.

In at least one example embodiment, the cap is integrally formed. The integrally formed cap may include the holder.

In at least one example embodiment, the transport material piece is arranged in the holder opening. In at least one example embodiment, the transport material piece has substantially the same size and shape as the holder opening.

In at least one example embodiment, the cap comprises at least one wall forming the hollow body that extends from the holder. In at least one example embodiment, the wall extends perpendicular to the holder. In at least one example embodiment, the wall extends perpendicular to a plane of the heating element.

The heating element may have at least two electrically conductive contact areas. The electrically conductive contact areas may be positioned at an edge area of the heating element.

In at least one example embodiment, the at least two electrically conductive contact areas are each positioned at a dense area of the heating element. The electrically conductive contact areas may be positioned on extremities of the heating element. An electrically conductive contact area may be fixed directly to the electrically conductive filaments. An electrically conductive contact area may comprise a tin patch. Alternatively, an electrically conductive contact area may be integral with the electrically conductive.

According to at least one example embodiment there is provided a cartridge for an aerosol-generating system. The cartridge comprises the heater assembly, a liquid storage portion for storing liquid aerosol-forming substrate, and a retainer for retaining the components of the heater assembly and for keeping the heater assembly in contact with the liquid storage portion.

In at least one example embodiment, the cartridge comprises a mouth piece configured to hold the liquid storage portion.

In at least one example embodiment, a host material piece is arranged in the interior space of the hollow body of the cap of the heater assembly. A transport material piece may be arranged in the holder opening of a holder that covers the first cap opening. The cap acts as a rigid housing for the transport material piece and the host material piece. The retainer keeps the heater assembly in contact with the liquid storage portion via the transport material piece and the host material piece. In at least one example embodiment, a proximal end of the wall of the cap adjoins the holder and a distal end of the wall of the cap engages the liquid storage portion.

The cartridge may be a disposable article to be replaced with a new cartridge once the liquid storage portion of the cartridge is empty or below a minimum volume threshold. In at least one example embodiment, the cartridge is pre-loaded with liquid aerosol-forming substrate. The cartridge may be refillable.

The cartridge and its components may be made of thermoplastic polymers, as polyether ether ketone (PEEK).

At least one example embodiment relates to an aerosol-generating system, comprising a main unit and the cartridge. The cartridge is removably coupled to the main unit.

As used herein, the cartridge being "removably coupled" to the main unit means that the cartridge and the main unit can be coupled and uncoupled from one another without significantly damaging either the main unit or the cartridge.

The aerosol-generating system may further comprise electric circuitry connected to the heater assembly and to an electrical power source, the electric circuitry configured to monitor the electrical resistance of the heater assembly or of one or more filaments of the heater assembly, and to control the supply of power to the heater assembly dependent on the electrical resistance of the heater assembly or the one or more filaments.

The electric circuitry may comprise a microprocessor, which may be a programmable microprocessor. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

The aerosol-generating system comprises a power supply, typically a battery, within the main body of the housing. As an alternative, the power supply may be another form of charge storage device such as a capacitor. The power supply may require recharging and may have a capacity to allow for the continuous generation of aerosol for a period of around six minutes or for a period that is a multiple of six minutes. In another example embodiment, the power supply may have sufficient capacity to allow for a desired (or, alternatively predetermined) number of puffs or discrete activations of the heater assembly.

In at least one example embodiment, the aerosol generating system comprises a housing. In at least one example embodiment, the housing is elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyether ether ketone (PEEK) and polyethylene. In at least one example embodiment, the material is light and non-brittle.

In at least one example embodiment, the aerosol-generating system is portable. The aerosol-generating system may have a size comparable to a cigar or a cigarette. The aerosol-generating system may have a total length ranging from about 30 millimeters to about 150 millimeters. The aerosol-generating system may have an external diameter ranging from about 5 millimeters to about 30 millimeters.

The aerosol-forming substrate is a substrate configured to release volatile compounds that can form an aerosol. The volatile compounds may be released by heating the aerosol-forming substrate.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenized plant-based material. The aerosol-forming substrate may comprise homogenized tobacco material. The aerosol-forming substrate may comprise at least one aerosol-former. The aerosol-forming substrate may comprise other additives and ingredients, such as flavourants.

According to at least one example embodiment, a method for manufacturing a fluid permeable heater assembly includes providing a substantially flat electrically conductive heating element, and over-molding a cap on edge areas of one side of the heating element. The cap comprises a hollow body with a first and a second cap opening. The first cap opening is opposite to the second cap opening. The heating element is mounted on the cap such that the heating element extends across the first cap opening.

The providing of a heating element may comprise providing a mesh strip. The mesh strip may comprise an alternating sequence of mesh sections of a first mesh density and a second mesh density. Having sections of a higher density may increase the stability of the mesh while handling it.

The providing the heating element may further comprise die cutting bevelled window slots out of each side of a mesh section of the first mesh density, and removing loose wires from the cut mesh sections of the first mesh density.

In at least one example embodiment, the first mesh density is lower than the second mesh density.

In at least one example embodiment, the step of over-molding of a cap on edge areas of one side of the heating element comprises pre-heating plastic granules, injecting the plastic granules into a mold for making the cap, and over-molding the cap onto the underside of a mesh section of the second mesh density.

In at least one example embodiment, the over-molding a cap on edge areas of one side of the heating element further comprises cutting the heater assembly off the mesh strip, and removing debris from the heater assembly.

In at least one example embodiment, the cutting the heater assembly off the mesh strip comprises die cutting a mesh off the mesh strip. The heating element comprises the mesh, and the mesh is cut within a mesh section of the second mesh density such that the mesh comprises a mesh section of the first mesh density that is limited by mesh sections of the second mesh density on each of the two ends of the cut mesh.

In at least one example embodiment, the method for manufacturing a fluid permeable heater assembly further comprises joining at least two electrically conductive contact areas each onto an edge area of the other side of the heating element.

The joining at least two electrically conductive contact areas each onto an edge area of the other side of the heating element may comprise providing a tin foil strip, cutting off tin foil patches from a tin foil strip in a size that matches the shape and the size of the mesh section of the second mesh density, and compressing a tin foil patch onto the mesh section of the second mesh density. The foil strip may be made of a softer material than the material of the heating element.

In at least one example embodiment, the method for manufacturing a fluid permeable heater assembly further comprises inspecting the heater assembly.

In at least one example embodiment, the inspecting the heater assembly comprises transporting the heater assembly to inspection stations, measuring the electrical resistance of the heating element of the manufactured heater assembly, visually inspecting the heating element for correct wire count, clean cut-off of the mesh, correct mesh integrity, debris and tin foil attachment, and rejecting the heater assembly if the heater assembly fails at least one of the expected electrical resistance of the heating element and the expected result of the visual inspection.

At least one example embodiment relates to an apparatus for manufacturing a fluid permeable heater assembly.

In order to manufacture a heater assembly comprising a cap and a substantially flat electrically conductive heating element with a mesh, the apparatus for manufacturing a fluid permeable heater assembly may comprise at least one of the following equipment units: a mesh strip bobbin feeding unit for providing a mesh strip, the mesh strip comprising an alternating sequence of mesh sections of a first mesh density and of a second mesh density, a tin foil strip bobbin feeding unit for providing a tin foil strip, a tin foil cutting station for indexing a length of tin foil to be positioned over the mesh section of the second mesh density and for cutting tin patches from the provided tin foil strip, a tin foil pressing station for compressing to join the tin patches onto the top surface of the mesh section of the second mesh density, a mesh window cutting station for die cutting bevelled window slots out of each side of a mesh section of the first mesh density, a first cleaning station for removing loose wires from the cut mesh sections of the first mesh density, small particles, dust, or debris by cleaning with air pressure and vacuuming the surfaces of the cut mesh sections to remove debris, an injection molding machine for pre-heating plastic granules and injecting the same into a mold for making the cap, a mesh injection over-molding tool (possibly having a single cavity or several cavities) for over-molding the cap onto the underside of the mesh section of the second mesh density, a heater assembly cut-off station for cutting the heater assembly off the mesh strip by die cutting a mesh off the mesh strip, the heating element comprising the mesh, and the mesh being cut within a mesh section of the second mesh density such that the mesh comprises a mesh section of the first mesh density that is limited by mesh sections of the second mesh density on each of the two ends of the cut mesh, a second cleaning station for removing loose wires from the mesh by cleaning with air pressure and vacuuming the surfaces of the heater assembly to remove debris, a transfer unit for transporting the heater assembly to a heater assembly inspection station, the heater assembly inspection station may comprise a heater assembly resistance measuring station, a heater assembly vision inspection station and a heater assembly rejection station, a mesh stating pressure testing station, a heater assembly resistance measuring station for measuring the electrical resistance of the mesh and the tin foil strip of the manufactured heater assembly, a heater assembly vision inspection for visually inspecting the heater assembly, and a heater assembly rejection station for rejecting a heater assembly that is out of specification.

In at least one example embodiment of a manufacturing process, the equipment automatically manufactures a heater assembly from a mesh strip, a tin foil strip, and from plastic granules. The heater assembly comprises a cap and a substantially flat electrically conductive heating element.

A method of manufacturing according to at least one example embodiment may comprise a manual loading of at least one of a mesh strip bobbin, a tin foil strip bobbin, and plastic granules. The method may further comprise at least one of the method steps that are automatically executed by the manufacturing equipment. The method may include providing a mesh strip, the mesh strip comprising an alternating sequence of mesh sections of a first mesh density and of a second mesh density, providing a tin foil strip, indexing a length of tin foil to be positioned over the mesh section of the second mesh density, cutting tin patches from the provided tin foil strip, compressing to join the tin patches onto the top surface of the mesh section of the second mesh density, and die cutting bevelled window slots out of each side of a mesh section of the first mesh density. The method may also include removing loose wires from the cut mesh sections of the first mesh density, small particles, dust, or debris by cleaning with air pressure and vacuuming the surfaces of the cut mesh sections to remove debris, pre-heating plastic granules, injecting the plastic granules into a mold for making the cap, over-molding the cap onto the underside of a mesh section of the second mesh density, and cutting the heater assembly off the mesh strip by die cutting a mesh off the mesh strip. The heating element comprises the mesh, and the mesh is cut within a mesh section of the second mesh density, such that the mesh comprises a mesh section of the first mesh density that is limited by mesh sections of the second mesh density on each of the two ends of the cut mesh. The method may also include removing loose wires from the mesh, small particles, dust, or debris by cleaning with air pressure and vacuuming the surfaces of the mesh to remove debris, transporting the heater assembly to an inspection station, and measuring the electrical resistance of the mesh of the manufactured heater assembly. The method may also include visually inspecting the heater assembly for correct wire count, clean cut-off of the mesh, correct mesh integrity, debris and tin foil attachment, and rejecting the heater assembly if it is out of specification.

Features described in relation to one example embodiment may equally be applied to other example embodiments.

At least one example embodiment relates to a heater assembly.

Figure 1A:
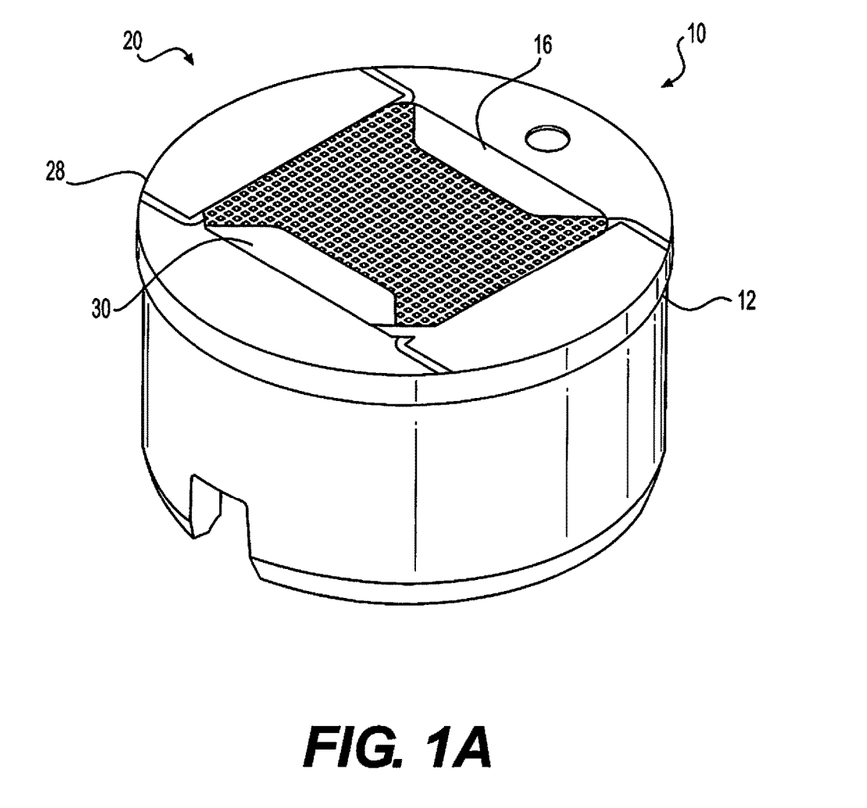
FIG. 1A is a perspective top side view of a heater assembly in accordance with at least one example embodiment.
Figure 2A:
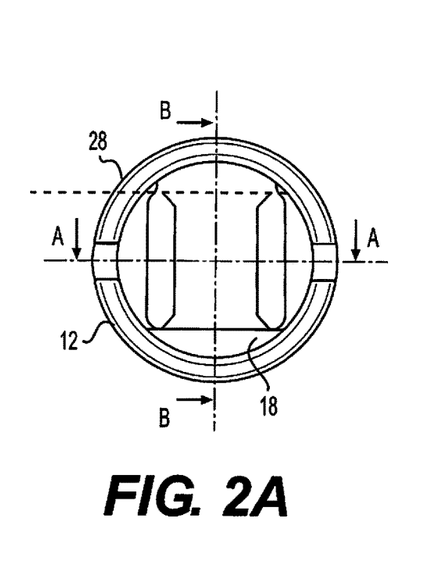
FIG. 2A is a top view of a cap and a holder according to at least one example embodiment.
Figure 2B:
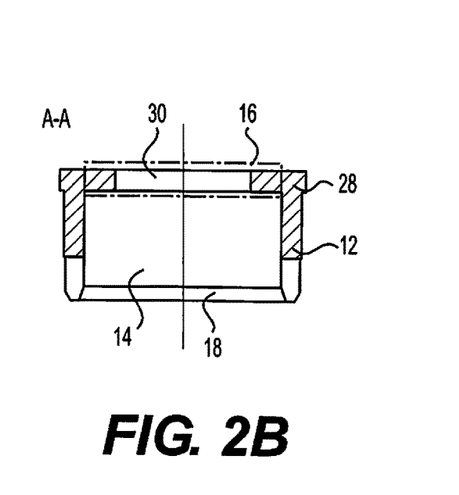
FIG. 2B is a cross-sectional view of the cap and the holder along line A-A of FIG. 2A according to at least one example embodiment.
Figure 2C:
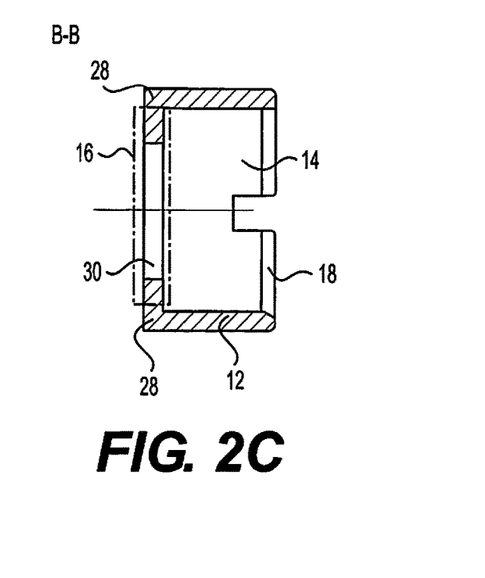
FIG. 2C is a cross-sectional view of the cap and the holder along line B-B of FIG. 2A according to at least one example embodiment.

In at least one example embodiment, as shown in FIG. 1A, a heater assembly 10 comprises a cap 12 with a first cap opening 16 on the top side of the cap and a second cap opening 18, shown in FIGS. 2A, 2B, and 2C, on the bottom side of the cap 12, The first cap opening 16 is covered by a holder 28 with a holder opening 30. The heater assembly 10 further comprises a heating element 20 which extends across the holder opening 30.

Figure 1B:
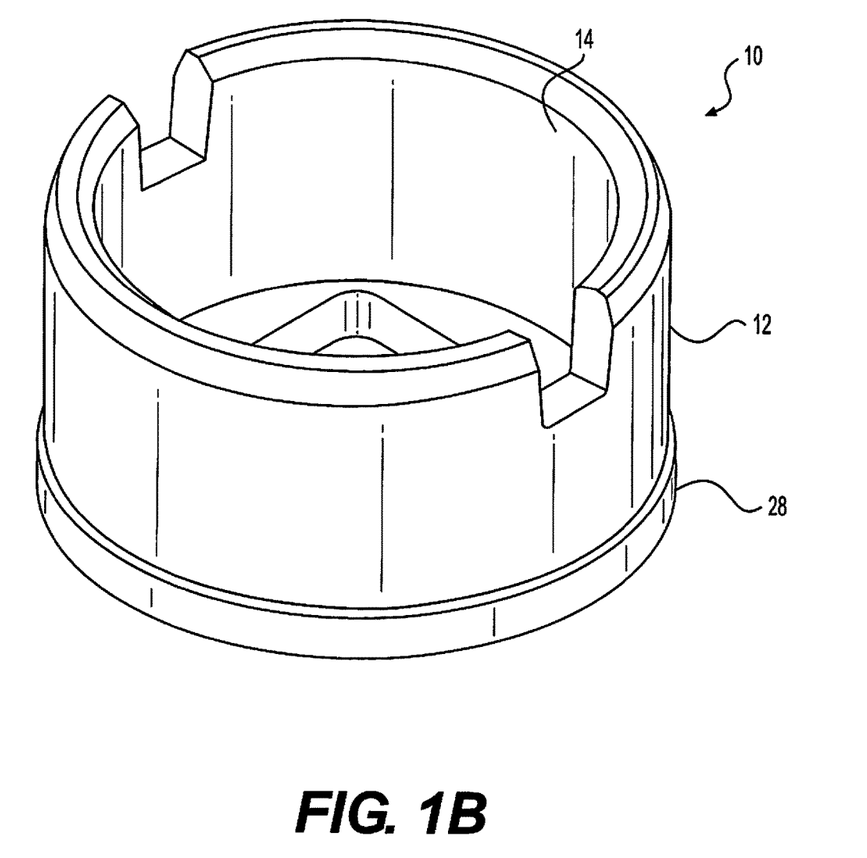
FIG. 1B is a perspective bottom side view of a heater assembly in accordance with at least one example embodiment.

FIG. 1B shows the heating assembly 110 from a bottom view. In at least one example embodiment, the interior space of the hollow body 14 of the cap 12 becomes visible.

Figure 1C:
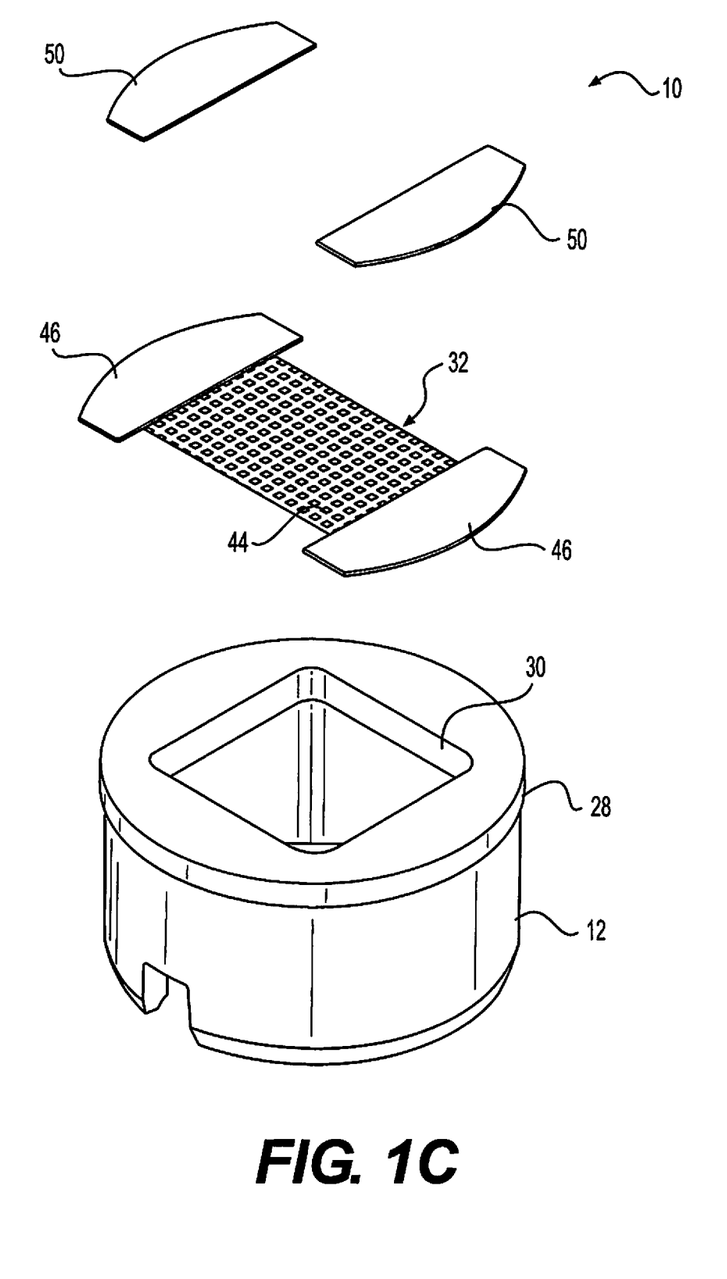
FIG. 1C is an exploded perspective view of a heater assembly in accordance with at least one example embodiment.

FIG. 1C shows the components of the heating element 20 comprising a mesh 32. The mesh 32 has a first mesh section 44 of a first mesh density and, on each of its two extremities, a second mesh section 46 of a second mesh density, wherein the second mesh density is higher than the first density. A tin foil patch 50 is joined with each of the two mesh sections 46 of the second mesh density. The heating element 20, respectively its mesh 32, is arranged across the holder opening 30 of the holder 28 on top of the cap 12. The entire mesh section 44 of the first mesh density is arranged above the holder opening 30.

Figure 2D:
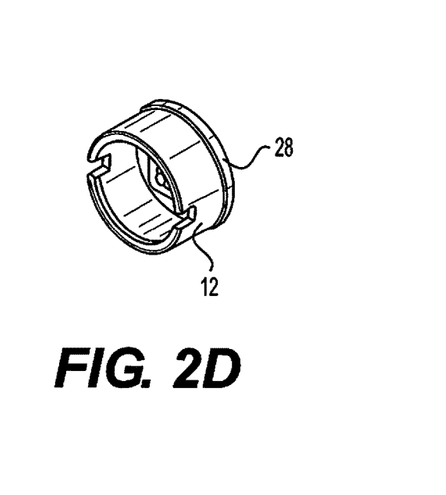
FIG. 2D is a perspective view of a cap and a holder in accordance with at least one example embodiment.

FIG. 2A is a top view of the cap 12 and its holder 28. The holder 28 may be a separate part. In at least one example embodiment, the holder 28 is an integral part of the cap 12. The interior body of the hollow body 14 of the cap 12 is of cylindrical shape. The cuts A-A and B-B of FIG. 2A are shown in FIGS. 2B-2D, respectively. The cap 12 and the holder 28 are integrally formed, wherein the perspective view of FIG. 2D shows holder 28 as a separate part. FIGS. 2B and 2C show the first cap opening 16 which is partially closed by holder 28 so that only a smaller portion, referred to as holder opening 30, of the first cap opening 16 remains open and across which a heating element may extend.

Figure 3:
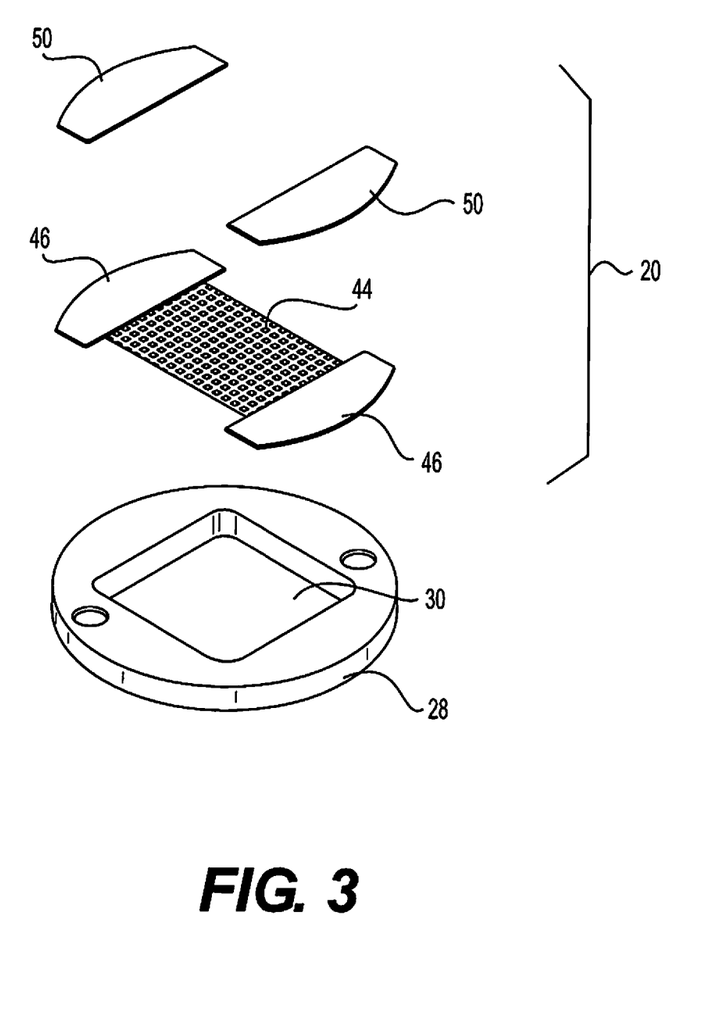
FIG. 3 is a top side view of a holder, a heating element, and contact areas in accordance with at least one example embodiment.

FIG. 3 shows the holder 28 formed as a separate part of cap 12, wherein the heating element 20 is mounted such that the mesh section 44 of the first mesh density extends across the holder opening 30.

Figure 4:
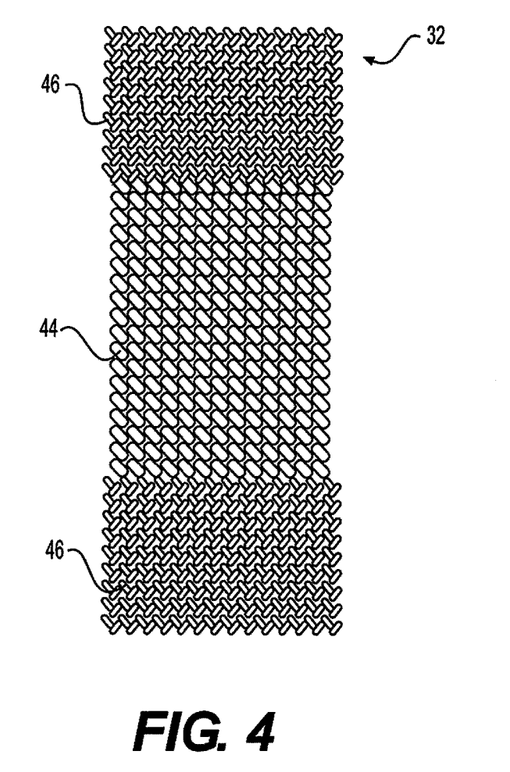
FIG. 4 is a top side view of a mesh having two different mesh densities in accordance with at least one example embodiment.

FIG. 4 shows a mesh 32 of the heating element 20. The mesh 32 comprises a mesh section 44 of a first mesh density and, on each of its two extremities, a second mesh section 46 of a second mesh density.

Figure 5:
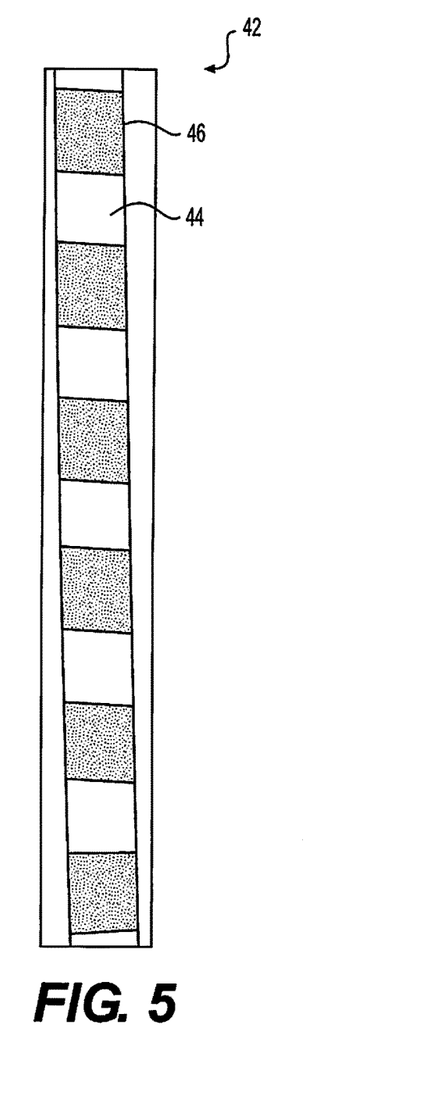
FIG. 5 is a top side view of a mesh strip for manufacturing a mesh in accordance with at least one example embodiment.

FIG. 5 shows a mesh strip 42 from which a number of meshes 32 may be die cut.

Figure 6:
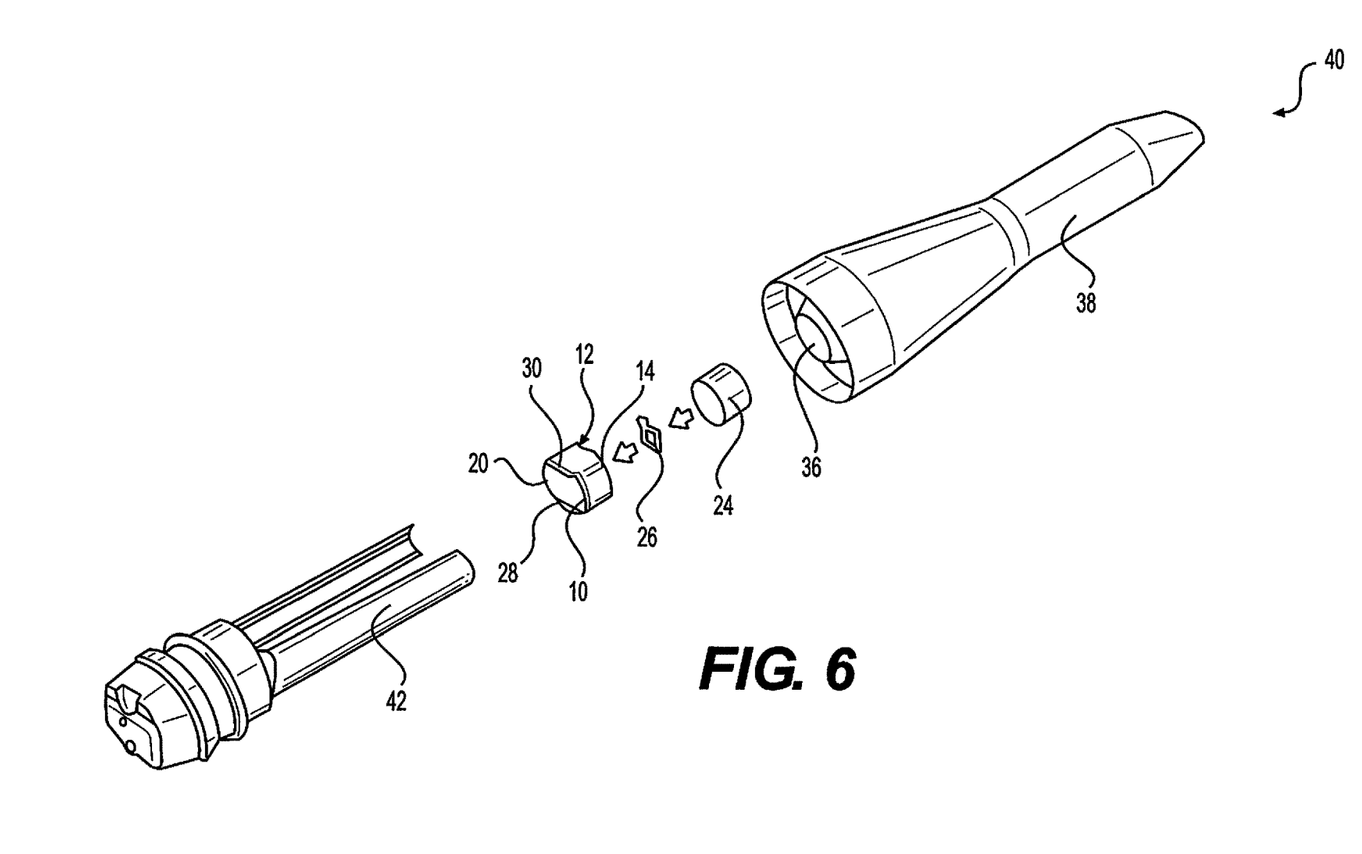
FIG. 6 is an exploded perspective view of a cartridge for an aerosol-generating system in accordance with at least one example embodiment.

FIG. 6 shows a cartridge 40 according to at least one example embodiment. The cartridge 40 comprises the heater assembly 10 with a cap 12 and a heating element 20 arranged on a holder 28 of the cap 12. A transport material piece 26 is arranged in a holder opening 30 of the holder 28. A host material piece 24 is arranged in the interior space of the hollow body 14 of the cap 12. The cap 12 acts as a rigid housing for the transport material piece 26 and the host material piece 24. The cartridge 40 further comprises a liquid storage portion 36 configured to store a liquid aerosol-forming substrate. A retainer 52 is configured to retain the components of the heater assembly 10 and to keep the heater assembly 10 in contact with the liquid storage portion 36 via the transport material piece 26 and the host material piece 24. Furthermore, the cartridge 40 comprises a mouth piece 38 in which the liquid storage portion 36 is arranged.

Figure 7:
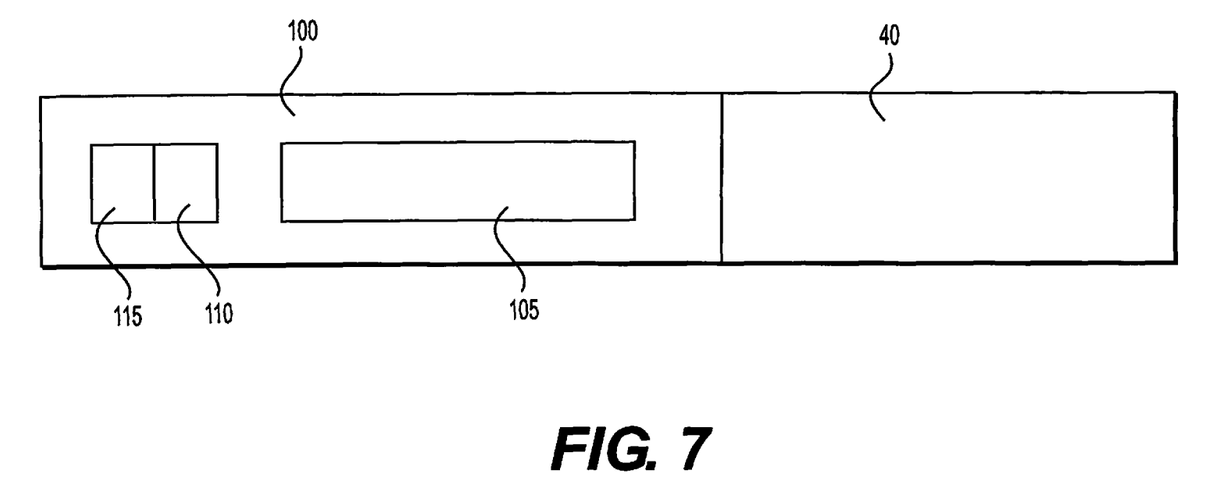
FIG. 7 is a schematic view of an aerosol-generating system in accordance with at least one example embodiment.

FIG. 7 is a schematic illustration of an aerosol-generating system according to at least one example embodiment.

In at least one example embodiment, as shown in FIG. 7, the aerosol-generating system may include a main unit 100 and the cartridge 40. The main unit may include a power supply 105, control circuitry 110, and a sensor 115.

The exemplary embodiments described above illustrate but are not limiting. In view of the above discussed exemplary embodiments, other embodiments consistent with the above exemplary embodiments will now be apparent to one of ordinary skill in the art.

We claim:

1. A cartridge for an aerosol-generating system, the cartridge comprising:
    a heater assembly including,
        a cap including,
            a hollow body having a first cap opening and a second cap opening, the first cap opening being opposite the second cap opening, the cap being integrally formed, and
            a holder including a holder opening, the holder configured to cover the first cap opening such that the holder opening superposes with at least a portion of the first cap opening, and
        a heating element, the heating element being an electrically conductive and fluid permeable heating element, the heating element including a mesh, and the heating element mounted on the holder such that the heating element extends across the holder opening;
    a storage portion configured to store an aerosol-forming substrate;
    a retainer extending over the holder opening, the heater assembly, and along at least a portion of sides of the storage portion;
    a host material piece including wicking material, at least a portion of the host material piece arranged in the hollow body between the first cap opening and the second cap opening; and
    a transport material piece configured to transport the aerosol-forming substrate from the host material piece to the heating element, the transport material piece in contact with the heating element, the transport material piece between the heating element and the host material piece.

2. The cartridge according to claim 1, further comprising:
    a mouth piece configured to hold the storage portion.

3. The cartridge according to claim 1, wherein an interior space of the hollow body has a substantially cylindrical shape.

4. The cartridge according to claim 1, wherein the mesh includes at least two electrically conductive contact areas, each of the at least two electrically conductive contact areas positioned at an edge area of the heating element, and the mesh extending across at least a portion of the first cap opening.

5. The cartridge according to claim 4, wherein the at least two electrically conductive contact areas are at a dense area of the heating element.

6. The cartridge according to claim 1, wherein the retainer includes at least two legs, which extend along the portion of the sides of the storage portion.

7. An aerosol-generating system, comprising:
    a main unit; and
    a cartridge for an aerosol-generating system, the cartridge comprising:
        a heater assembly including,
            a cap including,
                a hollow body having a first cap opening and a second cap opening, the first cap opening being opposite the second cap opening, the cap being integrally formed, and
                a holder including a holder opening, the holder configured to cover the first cap opening such that the holder opening superposes with at least a portion of the first cap opening, and a heating element, the heating element being an electrically conductive and fluid permeable heating element, the heating element including a mesh, and the heating element mounted on the holder such that the heating element extends across the holder opening, a storage portion configured to store an aerosol-forming substrate, a retainer extending over the holder opening, the heater assembly and along at least a portion of sides of the storage portion, the cartridge being removably coupled to the main unit, a host material piece including wicking material, at least a portion of the host material piece arranged in the hollow body between the first cap opening and the second cap opening, and a transport material piece configured to transport the aerosol-forming substrate from the host material piece to the heating element, the transport material piece in contact with the heating element, the transport material piece between the heating element and the host material piece.

8. The cartridge according to claim 7, wherein the host material piece is substantially a same size and a same shape as an interior space of the hollow body.

9. The cartridge according to claim 7, wherein the host material piece is in contact with the heating element.

10. The cartridge according to claim 7, wherein the transport material piece is in the holder opening.

11. The cartridge according to claim 7, wherein the transport material piece has substantially a same size and a same shape as the holder opening.

12. The cartridge according to claim 7, wherein a cross-sectional area of the host material piece is substantially the same as a cross-sectional area of an interior space of the hollow body.

* * * * *